United States Patent Office 3,354,057
Patented Nov. 21, 1967

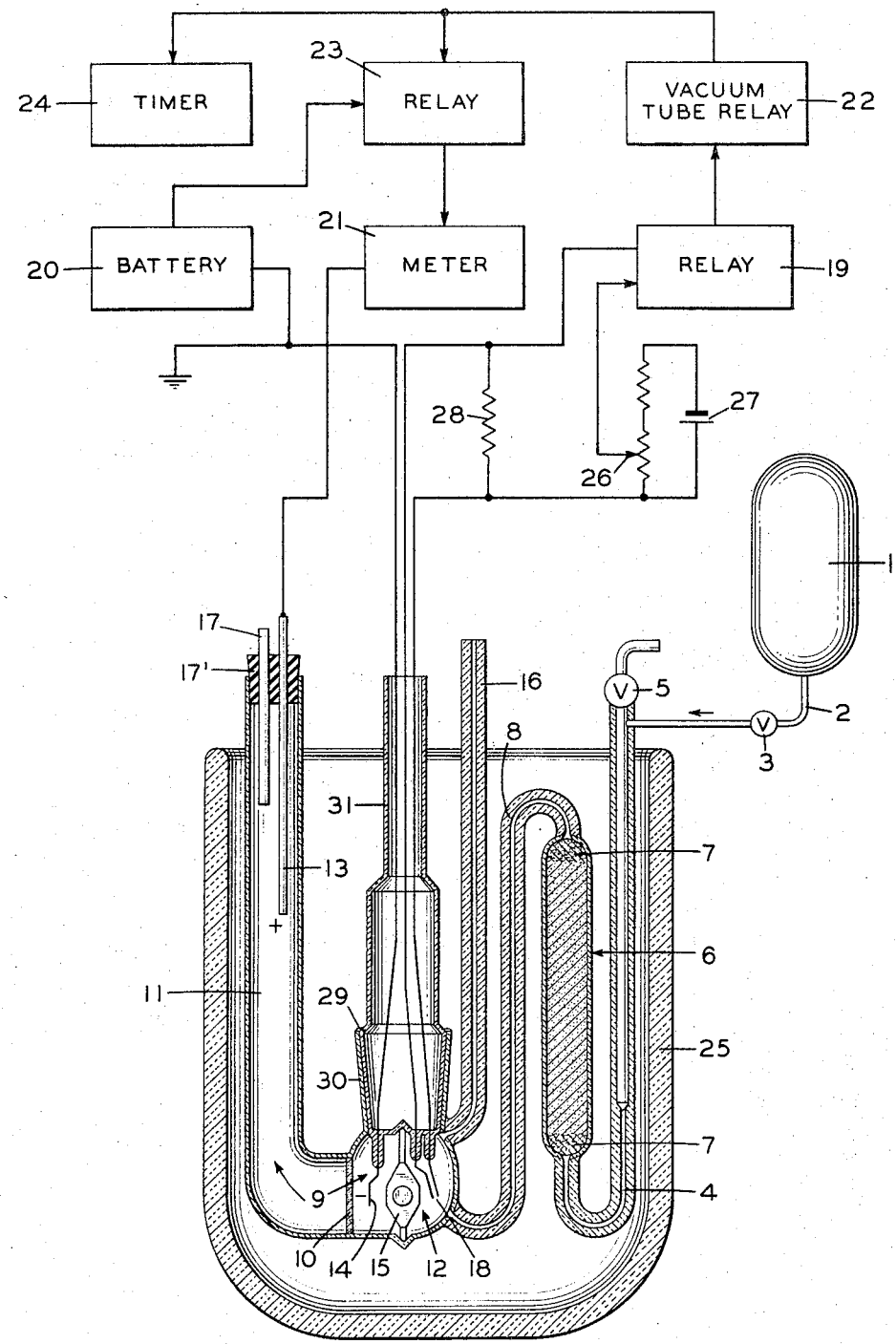

3,354,057
METHOD AND APPARATUS FOR DETERMINATION OF WATER IN LIQUID AMMONIA
William C. Klingelhoefer, Hopewell, Va., assignor to Allied Chemical Corporation, New York, N.Y., a corporation of New York
Filed Sept. 27, 1963, Ser. No. 312,048
11 Claims. (Cl. 204—1)

This invention relates to method of and apparatus for the determination of water in liquid ammonia. More particularly, this invention relates to a method for determining the amount of water in liquid ammonia wherein the amount of water contained therein is less than 100 p.p.m. $H_2O$.

Standard grade commercial anhydrous ammonia is one of the purest large tonnage materials. A few operations, such as the manufacture of stainless steel plate, however, benefit through use of an extra-quality ammonia of particularly low water content, i.e. a few p.p.m. $H_2O$. Such a product poses unusual problems of quality determination especially in analysis of contained water. Heretofore, no method with reliable accuracy for low range water content has been made available.

Evaporative procedures whereby water is determined by residue are not suitable for trace quantities. A standard method, i.e. determining dew point of the $3H_2+N_2$ gas mixture obtained by catalytic dissociation of the ammonia is generally considered dependable only when water content is above about 30 p.p.m.

It is an object of this invention, therefore, to provide a method for the determination of water in liquid ammonia where the water content is less than 100 p.p.m. and in particular where the water content is say about 2 p.p.m.-30 p.p.m. It is a further object of this invention to provide such a method where the procedures are reliably accurate in these lower water concentrations. It is a still further object of this invention to provide an apparatus suitable for use in the process of this invention which apparatus can be continuously used for successive water concentrtaion determinations without necessitating complete disassembly of the apparatus for cleaning purposes or the like. Other objects and advantages of the instant invention will become apparent from the following description and claims.

In accordance with this invention, an alkali metal halide salt is dissolved in liquid ammonia and the liquid ammonia is passed into an electrolytic cell provided with an anode and cathode. The cell contains a fritted glass or similar semiporous partition so as to separate the anode chamber of the cell from its cathode chamber. The alkali metal halide dissociates into positively charged alkali metal ions and negatively charged halide ions. When an electric current is supplied to the cell, the positively charged alkali metal ions pick up an electron at the cathode, are thus discharged to uncharged atoms, and subsequently react in their neutral state with any water contained in the liquid ammonia of the cathode chamber of the cell. This procedure continues until all the water has been reacted with alkali metal. The end point may be determined by two different methods. When an excess of unreacted alkali metal is present, a color change, normally blue, is noted in the liquid ammonia. This indicates an end point from which the concentration of water present can be mathematically determined. The end point can also be and is preferably determined by use of platinum electrodes or the like which measure a sharp rise in the conductivity of the cathode portion of the electrolysis cell when the excess unreacted alkali metal is present.

Referring to the accompanying drawing which is a sectional elevation of the apparatus, reference numeral 1 indicates a liquid ammonia sample cylinder from which the ammonia sample to be tested originates. This sample cylinder is connected via line 2, shut-off valve 3 and long-stemmed needle valve 5 to line 4 which leads up through tube 6 containing an alkali metal halide salt, the ends of which are packed with glass wool 7 or the like, to hold the salt in the tube. The top of tube 6 is connected by line 8 to electrolysis cell 9 which is divided by a fritted glass or similar semiporous partition 10. The electrolysis cell is divided by fritted glass partition 10 into an anode chamber 11 and a cathode chamber 12. The anode chamber contains an anode 13, preferably graphite for greater consistency of results and to obviate deposits forming on partition 10, while the cathode chamber contains a cathode 14 which is conductive but inactive to the chemicals in cathode chamber 12. In this regard, paltinum and gold are preferred because of their conductivity and inertness to materials in cathode chamber 12. The cathode section is provided with a bar magnet 15 which in conjunction with a conventional motor magnet stirrer (not shown) can operate to stir the liquid ammonia solution in the cathode chamber. The cathode chamber is also provided with cathode outlet capillary tube 16 which can be closed off with a rubber tube and screw clamp for release of gases so that a minimum volume of the main portion of the cathode chamber during operation of the process will be occupied by a gas which could possibly be a source of error or inaccuracy in determining the amount of water in the liquid ammonia. Similarly, the anode chamber 11 is provided with a gas outlet 17 which passes through the anode stopper 17' for release of gases during the process. In the embodiment shown, the apparatus is provided with platinum conductivity electrodes 18 in the cathode section 12 which are connected to the moving coil of a sensitive relay 19.

Battery 20 is connected through the relay 23 to meter 21 which in turn is connected to anode 13. An electric timing device 24 is connected to the vacuum tube relay 22. The input side of relay 23 is connected to the output of vacuum tube relay 22. The input of relay 22 is connected to the output of relay 19. The other side of relay 19 is connected across the two conductivity electrodes 18 via potentiometer 26 or other voltage dividing means which is in combination with battery 27. Cathode 14 is connected to the negative side of battery 20 thereby completing the circuit. Resistor 28 is shunted across conductivity electrodes 18 to allow a very small current to pass through the coil of relay 19 even when the cathode solution contains no free alkali metal. This permits checking of the relay operation by adjustment of potentiometer 26. Element 25 is an insulating vessel suitably a Dewar flask. Cathode chamber 12 has fitted at its top stopper 29 which is provided with ground joints. In assembling the apparatus the ground joints of stopper 29 are greased with a petroleum jelly or the like and the stopper is placed within the upward extending lip 30 of cathode chamber 12, the greased ground joints of the stopper 29 snugly fitting within circular upward extending lip 30. The stopper 29, in the embodiment shown is provided with a cylindrical channel 31 through which the leads to the cathode and conductivity electrodes pass.

In operating the process, the apparatus is adjusted in a preliminary test. The Dewar is filled with ammonia and brought to about $-40°$ C. The cell is flushed out with ammonia from cylinder 1 and filled to a level above anode 13. The sample valve 3 and cathode outlet 16 are closed. The electrolysis current is turned on. Current is supplied from battery 20 through a meter 21 via relay 23 and from there through anode 13 and through the liquid ammonia alkali halide salt solution to cathode 14. Potentiometer 26 and battery 27 in the circuit supply a voltage, say about 0 to 0.5 volt, adjusted as below described to give the desired end point. The current is cut off when the solution in the cathode section becomes a faint blue color. The potentiometer then is adjusted to give the voltage which will operate the relays under these conditions. Relay 23 responds to the current passing between the conductivity electrodes 18 and one side of the output controls the timer or electric stop clock 24, to stop the timer at the end point of the electrolysis while the other side of the output shuts off the current to the anode. Liquid ammonia or other coolant is maintained in insulating vessel 25 so as to keep the temperature in the electrolysis cell not above the boiling point of liquid ammonia, thereby keeping the ammonia in the cell in the liquid state during the determination.

Liquid ammonia to be analyzed is supplied from the ammonia cylinder 1, to flush out and fill the apparatus as above described. When the ammonia passes through tube 6 packed with alkali metal halide salt, it dissolves in its passage through said tube at least a stoichiometric amount of alkali metal halide salt relative to the expected number of mols of water present. The sample solution fills electrolysis cell 9 to the level set by line 8 and the current is passed through the cell as indicated above. The halide ions migrate through the fritted glass partition and yield electrons at the anode and are discharged. Alkali metal ions in the cathode chamber 12 migrate to the cathode 14 and are discharged. When they are discharged, they react with the water present in the liquid ammonia sample of the cathode chamber forming the corresponding hydroxide and releasing hydrogen. This process continues until all of the water has reacted and excess alkali metal is present in the liquid ammonia. Upon its formation a color change is noted in the solution and when conductivity electrodes are present, a sharp increase in the conductivity is observed which registers through the electrical connections and relays above described, thereby turning off electric stop clock 24.

The amount of water in the liquid ammonia in parts per million (p.p.m.) may be calculated as follows:

$$H_2O \text{ (uncorrected)} = \frac{18(10)^6}{96,500} \frac{it}{Vd}$$

where the mol weight of water is 18, the Faraday equivalent is 96,500 coulombs, $i$ is the electrolysis current supplied in amperes, $t$ is the time for electrolysis to the end point in seconds, $V$ is the volume of sample in the cathode chamber 12 in cubic centimeters, and $d$ is the density of liquid ammonia at the temperature at which the determination is performed in grams per cubic centimeter. Some hydrogen formed from the reaction of the water with the alkali metal forms a bubble in the liquid ammonia in the cathode chamber. At —40° C. and one atmosphere the $H_2$, $NH_3$ vapor mixture amounts to about 0.3 cc. per coulomb. This gas displaces part of the sample through the partition 10 and leads to low results. A correction for this factor depends on the water content as follows:

| $H_2O$, p.p.m.: | Correction to add, p.p.m. |
| --- | --- |
| 0 | 0 |
| 40 | 1 |
| 50 | 2 |
| 75 | 4 |
| 100 | 7 |

It is preferred in the practice of the instant process to use KCl in the alkali metal halide salt tube because of its solubility. Sodium chloride is more soluble in liquid ammonia and consequently more salt is dissolved in the liquid ammonia when sodium chloride is employed. Much of this salt as implied above is not necessary in the process of the instant invention since it is only essential to have an excess molar amount of salt relative to the expected mols of $H_2O$ present in the liquid ammonia. For example, the art (Audrieth L. F., Kleinberg, J., Nonaqueous Solvents, Wiley, 1953) teaches that liquid ammonia at 0° C. dissolves 0.132 weight percent KCl therein. In normal operation this amount of alkali metal salt is sufficient, Since very little KCl is dissolved, the tube can be used on a series of water concentration determinations in liquid ammonia without the necessity of refilling the tube with KCl. Therefore, it is readily apparent that KCl is the preferred alkali metal halide salt.

As indicated above, it is important to keep the liquid ammonia sample to be tested in the liquid state. For this reason, the electrolysis cell is held in a solution of coolant or the like maintained in a separate vessel. I have found that the cell may be held in a 70-mm. inside diameter by 200-mm. deep clear glass Dewar flask filled with liquid ammonia. Air is bubbled through the ammonia in the Dewar flask to keep the temperature at about —40° C., the preferred temperature for insuring that the liquid ammonia to be tested is in the liquid state.

It is important in the operation of the instant process to keep the system free from oxygen. Oxygen can be removed from the sample by bleeding the vapor space in the sample cylinder.

The process of this invention gives consistent results with samples containing as little as 2 p.p.m. $H_2O$ and up to at least 100 p.p.m. $H_2O$. At about 150 p.p.m. $H_2O$ and higher, the results become irregular and often no end point can be obtained. With samples in this high range the KCl dissolved in the sample probably is depleted before all the water has reacted.

In order to more fully illustrate this invention and the manner of practicing the same, the following examples are presented.

*Example 1*

The operation of the analyzer of FIGURE 1 was checked by testing ammonia samples before and after addition of known amounts of water. The water was placed in a short piece of 1/16" bore stainless steel tubing and flushed with liquid ammonia into an evacuated and cooled cylinder.

A sample of ammonia was tested using the analyzer of FIGURE 1 and the procedure above described using a Dewar flask measuring 70 mm. inside diameter by 200 mm. deep. The total volume of the analyzer was about 50 ml.; the cathode section held 8.5 ml. A current of 5 ma. was supplied from a 90 volt battery passing through a 20,000-ohm rheostat, through the relay contacts and a 25-ma. meter to the anode. The alkali metal halide salt employed was KCl. The anode employed was graphite having an outside diameter of 2 mm. (a pencil lead). The cathode was platinum sheet 2 x 5 mm. length, less than 1 mm. from the partition. The conductivity electrodes were also platinum 4 x 6 mm. and were spaced about 1 mm. apart. Electrolysis in the cell continued for 76 seconds before the end point was reached. With a sample of 8.5 ml. and a density of 0.69 gram per ml., the sample was indicated to contain 12 p.p.m. $H_2O$.

*Example 2*

A sample was made from 1,009 grams of the ammonia of Example 1 and 0.044 gram of water to give a sample containing an expected 56 p.p.m. $H_2O$. The material was tested in the same manner as in Example 1, i.e. by using KCl packed tube through which the liquid ammonia sample passed. This material required 1.69 coulombs corresponding to 54 p.p.m. $H_2O$. A correction of 2 p.p.m. $H_2O$ could be added to allow for the effect of the hydrogen formed as indicated above.

*Example 3*

A test was made by procedure of Example 1 with an ammonia sample that gave a value of 25 p.p.m. $H_2O$. After addition of water corresponding to 21 p.p.m., the mixture was tested by the procedure of Example 1 and gave a value of 46 p.p.m. $H_2O$.

Example 4

Using the procedure of Example 1, a test was made with ammonia which had been treated with sodium. Samples taken from the vapor phase of this ammonia showed 1.6 p.p.m. $H_2O$. Ammonia distilled from this sodium treated material and collected in a sample cylinder showed 6.4 p.p.m. $H_2O$ on analysis. A sample prepared by addition of 14.3 p.p.m. $H_2O$ to the latter sample was analyzed by the procedure of Example 1 and gave 19.3 p.p.m. $H_2O$.

From the foregoing, it is readily seen that the process of the instant invention provides a method whereby the amount of water in liquid ammonia can be readily determed. This process, as indicated above, is particularly suitable for liquid ammonia samples containing relatively small amounts of water therein, e.g. amounts less than 100 p.p.m. of water. It will be appreciated that one of the advantages of the process of this invention is that only a relatively short period of time is required for the water concentration determination, and in accordance with its simplicity, the process of the instant invention can be performed at commercial testing stations and in plants using liquid ammonia with a low maximum water content. The apparatus provided for the process can be small, is relatively uncomplicated, and does not necessitate expensive parts. It will be further appreciated that when potassium chloride is employed as the alkali metal halide salt that a series of water determinations can be run without entailing a complete disassembly of the apparatus, cleaning, and reassembly. Furthermore, use of this preferred salt enables determination to be performed without refilling the alkali metal halide salt tube. In addition to the above, other advantages of the instant invention are readily apparent to one skilled in the art or to one who has heretofore been unable to determine the amount of water in liquid ammonia with the accuracy provided by the present method.

While the above disclosure is intended to merely illustrate the nature of the invention and should not be construed as limiting the same, certain modifications or departures from the disclosure will be apparent to one skilled in the art. For instance, instead of passing the liquid ammonia sample into the alkali metal halide tube in order to dissolve the alkali metal halide in the liquid ammonia sample, one may, alternatively, add the alkali metal halide to the ammonia sample and the ammonia sample may be directly introduced into the electrolysis cell. In some cases when salts which readily dissolve in liquid ammonia are employed, this will be preferred in order to obviate an extensive excess amount of alkali metal halide salt being dissolved in the liquid ammonia sample. Accordingly, the present invention should be construed in the light of its spirit and scope.

I claim:

1. A method for the determination of water, having up to approximately 100 p.p.m., in liquid ammonia which comprises dissolving an alkali metal halide salt in a liquid ammonia sample to be tested, subjecting the halide containing ammonia sample to electrolysis in a cell having an anode and cathode chamber separated by a semiporous membrane to provide an anolyte and catholyte, determining the end point of the reaction of the water with the discharged alkali metal atoms, and maintaining the halide containing ammonia sample in the liquid state during the determination of the end point.

2. A method according to claim 1 wherein said end point is determined by measuring a rapid increase in the conductivity of the catholyte of the electrolysis cell.

3. A method according to claim 2 wherein the conductivity rise is determined by use of metallic electrodes placed in the cathode chamber of the electrolysis cell.

4. A method according to claim 3 wherein an increase in the conductivity of said catholyte of said electrolysis cell is determined by use of platinum electrodes in said cathode chamber, said platinum electrodes being in electrical combination with an electric stop clock.

5. A method according to claim 1 wherein said alkali metal halide salt is potassium chloride.

6. A method according to claim 1 wherein said alkali metal salt is sodium chloride.

7. A method according to claim 1 wherein said liquid ammonia is maintained at temperatures not in excess of $-40°$ C.

8. An apparatus for the determination of the amount of water in liquid ammonia, which comprises, an electrolysis cell, a semiporous membrane located within the cell forming an anode chamber and a cathode chamber, an anode provided with the anode chamber, a cathode provided within the cathode chamber, container means holding a supply of alkali metal halide salt, means for passing liquid ammonia through said container means to dissolve an amount of alkali metal halide salt, means connecting the container means to the cathode chamber for passing the ammonia containing halide to the electrolysis cell, means for stirring the ammonia containing halide in the cathode chamber, means for supplying a current to said electrolysis cell, means for determining the amount of current supplied to said cell, and means for maintaining said electrolysis cell at a temperature not above the boiling point of liquid ammonia under the pressure maintained in the cell.

9. An apparatus according to claim 8 wherein said cathode chamber has contained therein a pair of conductivity electrodes which in electrical combination with a relay provide means by which an increase in the conductivity of said cathode chamber is noted.

10. An apparatus according to claim 9 wherein said conductivity electrodes are in electrical combination with an electrical timing device in such a manner that when an increase in the conductivity of said cathode chamber occurs, the electrical timing device shuts off.

11. An apparatus according to claim 8 wherein said cathode chamber has connected thereto a cathode outlet capillary tube for release of gases formed within said cathode chamber and said anode chamber has an anode gas outlet for release of gases formed within said anode chamber.

References Cited

UNITED STATES PATENTS

| | | | |
|---|---|---|---|
| 2,758,079 | 8/1956 | Eckfeldt | 204—195 |
| 2,928,775 | 3/1960 | Leisey | 204—195 |
| 2,928,782 | 3/1960 | Leisey | 204—195 |
| 3,196,100 | 7/1965 | Digby | 204—195 |

OTHER REFERENCES

Epstein et al.: "Analytical Chemistry," vol. 19, No. 9, September 1947, pp. 675–677.

JOHN H. MACK, *Primary Examiner.*

T. TUNG, *Assistant Examiner.*